Sept. 30, 1952 W. VOGEL 2,612,267
PROCESS AND APPARATUS FOR PREPARATORY
DRESSING OF COAL, MINERALS, AND OTHER
SOLIDS, USING A HEAVY LIQUID
Filed July 23, 1947 3 Sheets-Sheet 2

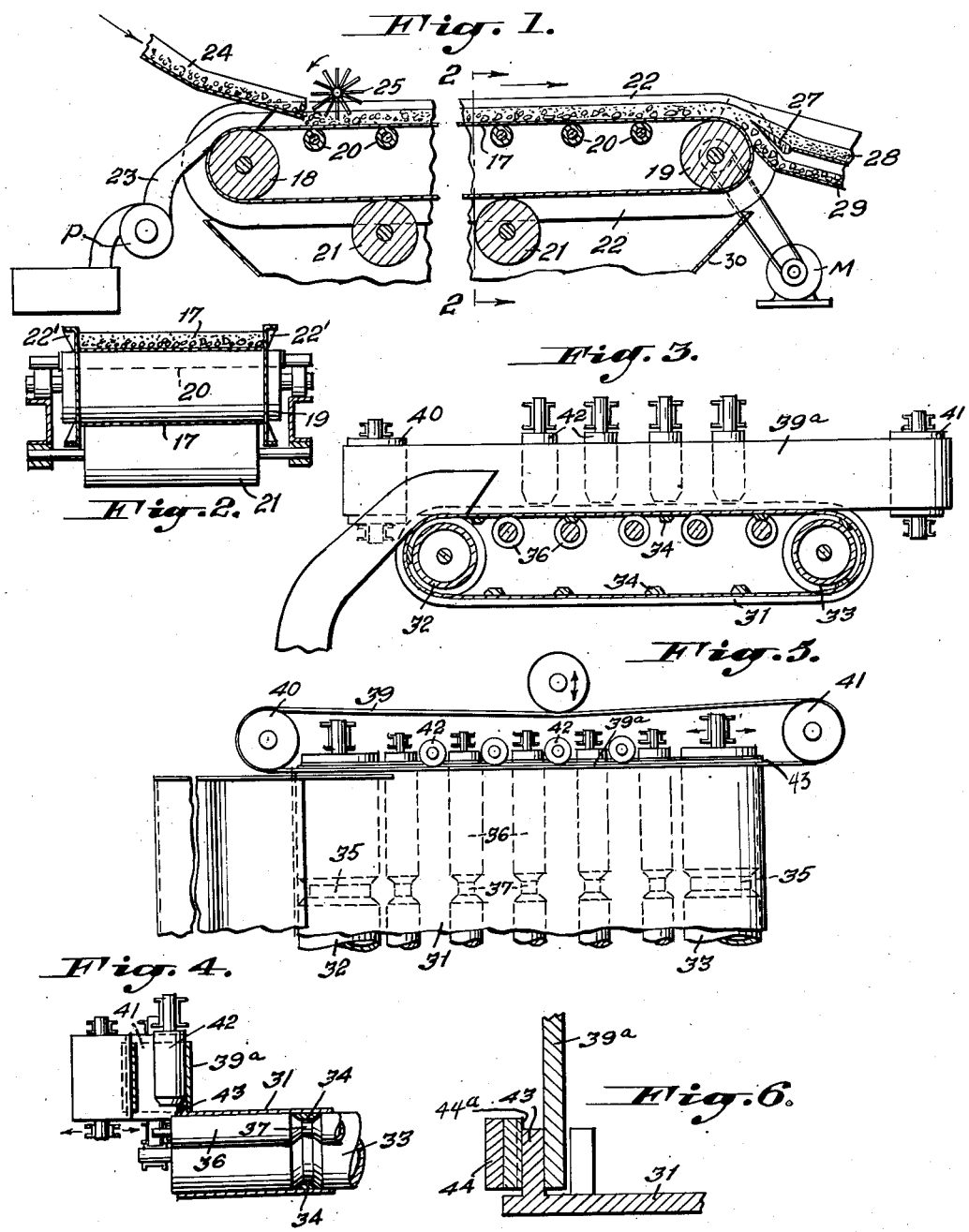

INVENTOR.
Walter Vogel
BY
Attorneys

Sept. 30, 1952

W. VOGEL 2,612,267

PROCESS AND APPARATUS FOR PREPARATORY
DRESSING OF COAL, MINERALS, AND OTHER
SOLIDS, USING A HEAVY LIQUID

Filed July 23, 1947

INVENTOR.
Walter Vogel
BY
Attorneys.

Patented Sept. 30, 1952

2,612,267

UNITED STATES PATENT OFFICE 2,612,267

PROCESS AND APPARATUS FOR PREPARATORY DRESSING OF COAL, MINERALS, AND OTHER SOLIDS, USING A HEAVY LIQUID

Walter Vogel, Santiago, Chile

Application July 23, 1947, Serial No. 763,118
In Switzerland September 11, 1946

13 Claims. (Cl. 209—173)

This invention concerns a process and apparatus for the preparatory dressing of coal, minerals and other solids, and particularly involves the utilization of a heavy liquid.

Separating processes utilizing heavy liquids flowing in launders, are already known. In these known processes the operating flow velocities are very low, inasmuch as only in this manner is it possible to maintain a regular and equal flow of the individual layers thereof, and furthermore, special guide devices for feeding and discharging the liquid are provided in order to insure operation of the process. It will be understood from the foregoing, that in such processes the output is generally very low, and furthermore, that complicated installations are required therefor, such as specially designed outlets having a reduced cross-section at the end, guide devices at the feed and discharge ends, and similar devices. Even taking into consideration the low output of such processes, the separation achieved thereby is not very regular, inasmuch as the same is affected by variations in the amount of material leaving the discharge end.

By eliminating these drawbacks, this invention provides a separation process utilizing heavy liquids, which, compared to all other known processes, embodies the advantages of a much higher output, a noteworthy simplification of the installations required, and the fact that perfection of separation is not so sensitive to variations in operating conditions and composition of the feed.

These and other advantages hereinafter described are achieved by the utilization of a principle that is absolutely new and characterized by the fact that separation is effected while the heavy liquid is flowing in a launder shaped apparatus whose discharge end is entirely unobstructed, wherein, relatively speaking, the heavy liquid is in a state of repose in relation to said apparatus, inasmuch as the latter travels at a comparatively high velocity, equal to at least one half of the square root of double the product of the constant of gravitation multiplied by the height of the liquid in the launder; in other words, equivalent to the velocity that would correspond to a friction free discharge of said liquid from a reservoir at a head equal to one fourth of the pressure existing at the bottom of the launder, provided that the heavy liquid is fed into the launder at the same level and velocity.

The divers forms of execution of the apparatus for carrying this invention into effect, are characterized in common by a launder shaped trough conveyor made of soft material, which from the feed end to the discharge end is completely horizontal or slopes only very slightly toward the discharge end. The launder operates in conjunction with a stream of rapidly flowing liquid occupying the full section of the launder from feed end to discharge end.

Other characteristics are covered by the claims, the subsequent paragraphs of this specification, and the drawings illustrate some examples of execution of the apparatus for carrying this invention into effect, and in which:

Figure 1 is a diagrammatic illustration partly in longitudinal section and partly in elevation of a form of apparatus for separating material according to the invention into two products.

Figure 2 is a cross-sectional view taken on the line 2—2 of Figure 1 and illustrating pleated side walls.

Figure 3 is a diagrammatic illustration partly in longitudinal section and partly in elevation of a modified form of the invention.

Figure 4 is a partial cross-section of the form illustrated in Figure 3.

Figure 5 is a partial plan view corresponding to the form illustrated in Figure 3.

Figure 6 is an enlarged sectional detail of a portion of Figure 4.

Figure 7:
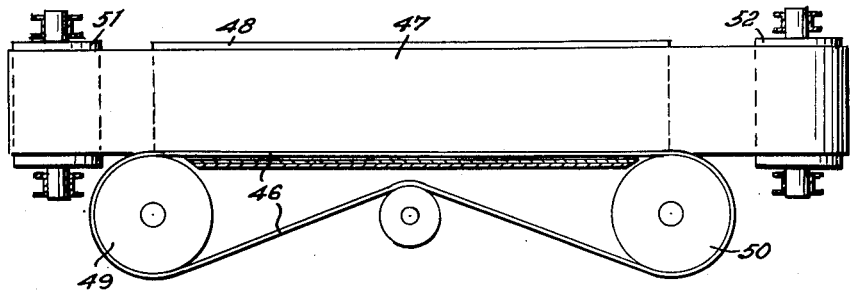
Figure 7 is a diagrammatic illustration partly in longitudinal section and partly in elevation of a further modification of the invention.
Figure 9:
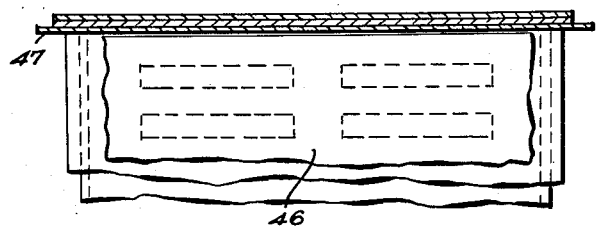
Figure 9 is a partial view in plan and partly in section of Figure 7.
Figure 8:
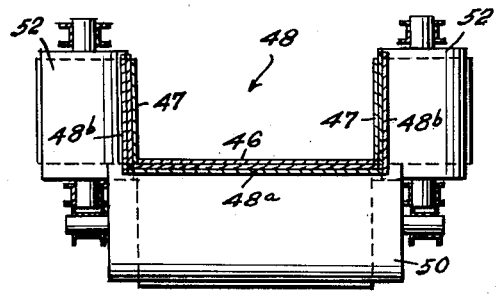
Figure 8 is a cross-sectional view of the arrangement shown in Figure 7.

Referring to the form of execution illustrated in the drawings, the following general explanations may be given:

The material to be separated is fed into a launder of invariable form and dimensions from end to end by means of adequate feed devices and in so far as possible, at the same velocity and in the same direction as the flow of the heavy liquid, so as not to create vertical components of velocity. The heavy liquid is discharged at the discharge end of the launder over the full section thereof and without any restriction. Removal of the several layers comprising divers products, is effected by adjustable separator vanes that project into the cascading stream of the falling heavy liquid, which vanes are made preferably and at least in the leading edges of a hard wear-resisting material. Due to the reciprocal state of repose existing between the separating liquid and the walls of the launder, undesirable eddies are avoided, specially such eddies having vertical components of velocity which otherwise would be impossible to avoid, considering the high flow velocity.

With this process there is no friction along the bottom or side walls of the launder shaped conveyor, nor is there any scrubbing action on the product to be separated. It also eliminates the necessity of providing guides or other devices at the discharge end of the conveyor, it merely being necessary to equip the feed end thereof with adequate devices so that the heavy liquid and the material to be separated, are fed into the launder at the same velocity as the velocity of the travelling launder, and in adequate quantity. In the process covered by this invention the launder shaped conveyor travels at velocities ranging from approximately one to two meters per second, the output being proportionated thereto.

Due to the high velocity, the time that the material remains in the launder is very short, even though the launder be of relatively large length. In a launder twenty meters long and travelling at the rate of two meters per second, this time is only ten seconds. In order that during this short space of time the separation process be effected with the desired degree of perfection, the depth of the layer of material fed into the launder should be equal to the size of the largest particles thereof, and the depth of the stream of liquid should be at least two and one half times, but not over four times, the size of said largest particles. Thus, for example, if it is desired to wash 10 to 80 millimeter mesh coal, the depth of the layer of coal would be 80 millimeters, and the height or depth of the liquid would be approximately 300 millimeters.

The process covered by this invention is particularly suitable for separating feed material into more than two products. For this purpose various streams of heavy liquids of diverse specific gravities, corresponding to the required separation densities, are fed into the travelling launder simultaneously, and in this case the height or depth of the stream should likewise be two and one half or three times the size of the largest particles to be separated. These diverse streams of liquids flow in the launder with the same velocity in superimposed relation to each other, that is, in relation to the respective densities. The same effect occurs when an unstable heavy liquid is fed into the launder, which upon approaching the discharge end separates into different zones of increasing density. In such cases separation of the products requires several separate vanes instead of one, the front part thereof being screen shaped. By placing a non-perforated guide plate under each separator vane, separation of the diverse streams of liquids is insured. Depth of immersion of the floating particles below the plane of separation between two separating liquids of diverse density, is taken into account in this case, inasmuch as the screen shaped front part of the separator vane is made to cut more or less the middle of the separating stream. Each partial stream is reestablished by the guide plate under the respective vane, and pumped back to the feed end of the launder in separate cycle.

In the preferentially described form of execution of this invention, the launder itself travels. It is also possible to effect this separation process in a fixed launder. In this form of execution the stream of liquid flows in guide linings that travel at adequate velocity, which linings are similar to travelling belts, and here also the liquid is in a state of repose in relation to said guide linings.

If in any of the described forms of execution of this invention it is desired to avoid atmospheric friction against the surface of the liquid stream, which might be necessary in the case of very accurate separations, this can be accomplished by placing floating covers thereon travelling at the same velocity as the launder, either in the form of travelling rubber belts, or in the form of a stream of air travelling at the same velocity along the surface of the heavy liquid.

Where perfection of separation is not so important and it is desired to simplify the apparatus and lower the cost of installation—which generally applies in the separation of large size particles—this can be accomplished by eliminating the side linings, leaving only the bottom lining, travelling at the same velocity as the stream of liquid.

It is also possible to still further simplify the installation where perfection of separation is even less important, by working with a fixed launder without even the travelling bottom. In this case the launder is adequately sloped and the volume of feed is such that throughout the entire length of the launder the velocity will be so high that all material sinking to the bottom will be advanced to the unobstructed discharge end of the launder where the depth of the stream of liquid will still be at least two and one half times the size of the largest particle of the material to be separated. Although this form of the process does not comprise either the friction free flow of the stream of liquid or the idea of the state of repose of the liquid in relation to the inside of the launder, it does nevertheless, retain the principle of the free and unobstructed discharge end, as well as the principle of the high flow velocity of the liquid in the launder, and these two characteristics suffices to achieve the discharge of the liquid free and clear of the end of the launder. The velocity selected may be so great that even the heaviest and most irregular particles of the material to be separated will be advanced by the stream of liquid.

Operation of the process and devices comprising the apparatus will be described in subsequent paragraphs hereof in relation to the figure shown in the accompanying drawings.

In Figure 1 the launder shaped endless conveyor 17, of rectangular slot shaped cross section, is made of rubber or other suitable material. This launder passes around end pulleys 18 and 19, the latter constituting a drive pulley driven by motor M. The portion of the launder used for the separation process is supported by idlers 20 spaced between pulleys 18 and 19; and the return side of the launder is supported by idlers 21. The side walls 22 of the launder may be corrugated. Said side walls may also be accordion pleated as at 22', Figure 2, or made of porous cellular rubber, to facilitate stretching thereof when passing around the end pulleys.

The feed end of launder 17 coincides with duct 23 which feeds the heavy liquid from a reservoir R by means of pump P. The volume and velocity of the liquid fed into the launder coincides with the velocity of said launder.

The material to be separated is fed into the launder by conveyor 24 located over the feed end and as close as possible to the surface of the heavy liquid. The end of this conveyor may be vibratory so as to facilitate loosening of the feed material, and its velocity shall be such that the velocity of the material fed into the launder will coincide with the velocity of said launder. In order to avoid inclusion of particles which should sink to the bottom, in the feed material that float as soon as they are fed into the launder, special device 25 such as rotary disks, vanes, blades or other similar devices, are appropriately located at the feed end. These devices serve to submerge the feed material in the liquid, thereby helping to loosen the heavy from the light particles. As a matter of expediency, the velocity of these rotating disks, vanes or blades 25, is made to coincide with the velocity of the liquid. A similar effect may be achieved by using rakes that periodically dip into the liquid. The heavy liquid is discharged free and clear of the discharge end of the launder, and there is no contraction in the cross section of the latter throughout its entire length.

As a matter of expediency, the radius of the drive pulley 19 is less than the arc of curvature of the discharge stream. The leading edge of the adjustable vane 27 at the discharge end, is made to cut into the discharge stream of the heavy liquid at a height corresponding to the plane of separation between the layers of light and heavy particles separated according to density. The former are removed on plate 28 and the latter on plate 29. As a matter of precaution a receiver or tray 30 is placed under the discharge end of the launder 17 to recover any liquid spilling from the launder. The form of execution illustrated corresponds to the separation of two products.

In the form of execution illustrated in Figures 3 to 6 the bottom of the launder comprises an endless belt 31 made of rubber or other similar elastic material, which passes around guide pulleys 32 and 33, one of which is driven in the manner shown in Figure 1. The back of the belt 31 is provided with guide protuberances 34. The pulleys 32 and 33 are each fitted with slots 35 for engaging said protuberances so that the belt is guided properly. The portion of the belt 31 forming the bottom of the launder, is supported by idlers 36 likewise fitted with slots 37 to engage the guide protuberances 34. As shown in Figure 6 the edges of belt 31 are fitted with upstanding flanges 43. The two side walls 39a of the launder, are likewise constituted by endless belts 39 made of rubber or other similar material, which pass around vertical pulleys 40 and 41, one of which is a drive pulley and driven by a motor, not shown. The velocity of both side belts coincides with the velocity of belt 31 forming the bottom of the launder. The belts forming the sides 39a of the launder are supported by idlers 42. The bottom edges of belts 39 rest against the flanges 43 of belt 31 and are forced against said flanges by the pressure of the liquid flowing in the launder. The side belts 39 may also be provided with guide protuberances. The side belts are longer than the bottom belt, and therefore project beyond the latter at the discharge end of the launder, so that the cutting of the discharge stream is effected between the two side belts.

In order to avoid lateral deflection of the flanges 43 of the bottom belt 31, a fixed strip 44 as shown in Figure 6 may be added. The bearing surface 44a of this strip may be of glass or other similar material. As a matter of precaution, endless belts 31 and 39 are equipped with tension take-up devices not shown.

Figure 10:
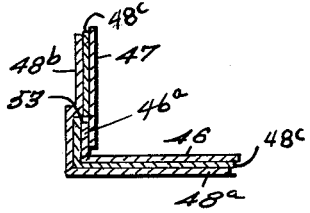
Figure 10 is an enlarged cross-sectional view of a preferred form of corner construction at the juncture of the bottom belt and the side belt of the invention illustrated in Figure 7.

The form of execution of the apparatus covered by this invention as illustrated in Figures 7 to 10, differs from the forms of execution described in the preceding paragraphs in that the endless belts, namely the bottom belt 46 and the side belts 47 constituting the lining, traverse a fixed launder 48 open at the top and both ends. The bottom belt 46 travels along the bottom 48a of this fixed launder. Preferably, and as shown in Figure 10, the side walls 48b of this fixed launder, as well as the bottom 48a thereof, are covered with glass or similar lining material 48c, serving to support the side belts 47. The bottom belt 46 passes around pulleys 49 and 50, and the side belts pass around pulleys 51 and 52. One pulley of each pair of pulleys is a drive pulley and driven in the manner illustrated in Figure 1. As further shown in Figure 10 the edges of the bottom belt 46 are provided with vertical flanges 46a that travel in an inset 53 along the lower portion of the side walls 48b. The side belts 47 are forced against the flanges 46a by the pressure of the liquid flowing in the launder, thus forming a hermetic joint.

Figure 11:
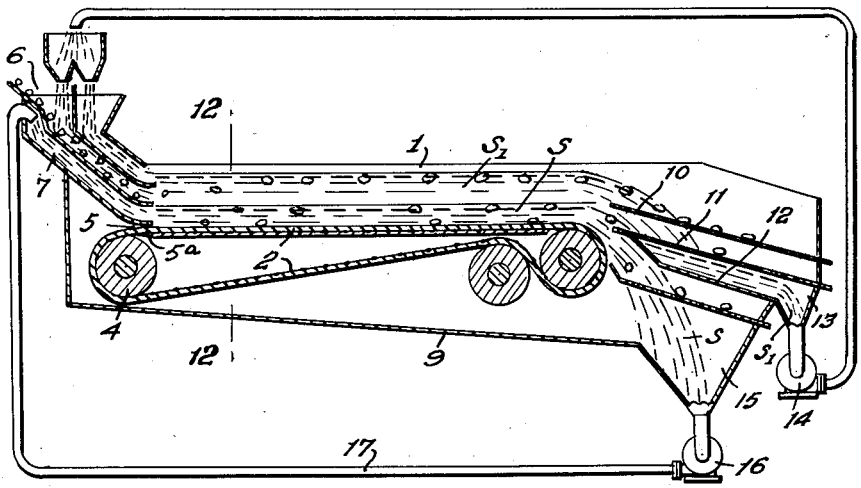
Figure 11 is a diagrammatic illustration of a further modification of the apparatus in accordance with the invention partly in plan and partly in longitudinal section.
Figure 12:
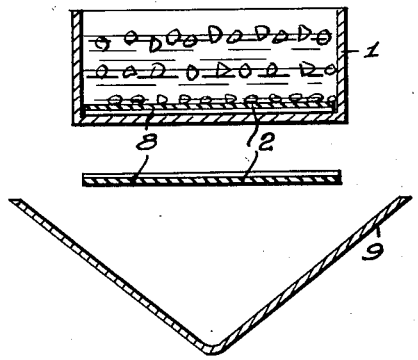
Figure 12 is a cross-section taken on lines 12—12 of Figure 11.
Figure 13:
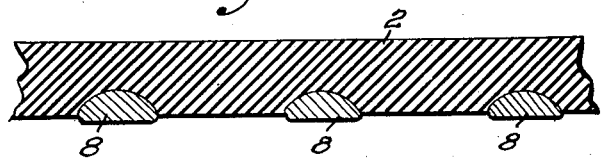
Figure 13 is an enlarged sectional detail view of the belt structure utilized in the form shown in Figure 11.

The form of execution of this invention illustrated in Figures 11 to 13 can be utilized where perfection of separation is not so important and it is desired to simplify the apparatus. In this form of execution an endless bottom belt 2 travels along the bottom of a rectangular cross sectioned open launder 1 and at the discharge end thereof said belt passes around drive pulley 3 driven by a motor, not shown, and the belt returns around pulley 4 and through a slot 5 in the launder 1. This slot is so arranged as to be hermetic. The feed end of the launder is equipped with a duct 6 of normal construction, for feeding the heavy liquid. The apparatus illustrated in this modification is suitable for separating three products. For this purpose two streams of heavy liquid of diverse densities are used, which flow in the launder in superimposed relation to each other. The heavier liquid is fed into the launder through duct 7 leading from the reservoir 15, and travels along the bottom of the launder in a state of repose in relation to the conveyor belt 2 which travels at the same velocity. As a matter of expediency, this rubber conveyor belt is supplemented with metallic plates 8 vulcanized thereto in order to make it heavier and improve the friction coefficient between the belt and the bottom of the launder.

Further, the radius of the drive pulley 3 is less than the arc of curvature of the discharge stream, so that said stream discharges free and clear of the launder. In front of slot 5 at the feed end of the launder, a slight curvature 5a is provided to insure immediate adjustment of the belt along the bottom of the launder. A receiving tray 9 is placed under the launder to recover any of the heavy liquid that may spill from the launder. The discharged end of the launder may be lowered in conjunction with drive pulley 3 in order to provide such slope as may be required to counteract side wall friction and achieve adequate flow conditions. The adjustable strainer shaped separator vanes 10 and 11 are so adjusted as to cut into the middle of each of the partial streams S and S1 as they are discharged from the end of the launder. The non-perforated guide plate 12 (placed under separator vane 11) catches the lower partial stream of greater density S and separates it from partial stream S1 of lesser density. The upper partial stream is caught by guide plate 12 and led to reservoir 13 from whence it is pumped back to the feed end of the launder after having been clarified and the density thereof corrected. The lower partial stream S is likewise led to reservoir 15 from whence it is pumped back to the feed end of the launder by pump 16 through duct 17.

In all the forms of execution described in the preceding paragraphs, it is possible to adjust the slope of the launder for greater convenience in operation.

None of the drawings illustrate the floating covers which may be used to eliminate atmospheric friction against the surface of the liquid stream, which covers are made to travel at the same velocity as the stream of liquid, the travelling launder or the rubber belts travelling in fixed launders.

The forms of execution herein described merely depict the most important of the many possibilities for carrying into effect the new process covered by this invention. All of these forms of execution comprise a stream of liquid discharged from a launder, a launder in whose cross section there is no contraction throughout its entire length, and in which the heavy liquid flows rapidly towards the discharge end.

In all of the forms of execution generally described in the preceding paragraphs, all of which are characterized by their high output and great simplicity of equipment—eliminating the use of buckets, scrapers and other wearing devices—relatively little space is required for installation of the entire plant, the same being equivalent to only a fraction of the space required by processes heretofore in use for the decantation, washing and similar methods of dressing materials. Inasmuch as the apparatus covered by this invention also eliminates the necessity of differences in elevation and level, the entire plant can be installed in a one story structure.

I claim:

1. Sink and float process of separating solid materials of different specific gravities, using a heavy liquid of intermediate density, which comprises producing a continuous non-turbulent horizontal stream of the heavy liquid having a sufficient depth and length to carry out the separation, and ending in a free fall of the whole width and depth of the stream, by conveying the liquid on a conveyor at a velocity equal at least to one-half of the square root of twice the product of the constant of gravity multiplied by the depth of the liquid, the liquid being fed in the whole width and depth of the stream with the same velocity as the conveyor, feeding the materials to be separated upon the stream at its beginning, cutting the stream horizontally after its having left the conveyor at the free fall, thus dividing it into different layers carrying the particles of the solid materials of different densities, taking the separated products from each layer of the heavy liquid, and returning the heavy liquid to the feeding point of the stream.

2. Sink and float process of separating solid materials of different specific gravities, using a heavy liquid of intermediate density, which comprises producing a continuous non-turbulent horizontal stream of the heavy liquid having a sufficient depth and length to carry out the separation, and ending in a free fall of the whole width and depth of the stream, by conveying the liquid on a conveyor at a velocity equal at least to one-half the square root of twice the product of the constant of gravity multiplied by the depth of the liquid on the conveyor, the liquid being fed in the whole width and depth of the stream with the same velocity as the conveyor, feeding the materials to be separated upon the stream at its beginning with the same velocity, immersing the materials into the stream, the light particles of the materials floating and the heavy particles sinking to the bottom of the conveyor, cutting the stream horizontally after its having left the conveyor at the free fall, thus dividing it into different layers carrying the particles of the solid materials of different densities, taking the separated products from each fraction of the heavy liquid, and returning the heavy liquid to the feeding point.

3. Sink and float process of separating solid materials of different specific gravities, using a heavy liquid of intermediate density which comprises producing a continuous non-turbulent horizontal stream of the heavy liquid having a sufficient length to carry out the separation and a depth of two and one-half of the largest particle size of the materials to be separated, and ending in a free fall of the whole width and depth, by conveying the liquid on a conveyor at a velocity equal at least to one-half of the square root of twice the product of the constant of gravity, multiplied by the depth of the liquid on the conveyor, the liquid being fed in the whole width and depth of the stream with the same velocity as the conveyor, feeding the materials to be separated upon the stream at its beginning in a layer of an average thickness at least equal to the largest particle size of the materials, the light particles of the materials floating, and the heavy sinking to the bottom of the conveyor, cutting the stream horizontally after its having left the conveyor at the free fall, thus dividing it into different layers carrying the particles of the solid materials of different densities, taking the separated products from each fraction of the heavy liquid, and returning the heavy liquid to the feeding point.

4. Sink and float process of separating solid materials of different specific gravities, using heavy liquids of different intermediate densities, which comprises producing a continuous non-turbulent horizontal stream of superposed heavy liquid layers, the heaviest being at the bottom and the lightest at the top, each layer having a depth of two and one-half to three times the largest particle size of the materials to be separated, the stream ending in a free fall of the whole width and depth of the total stream, by conveying the liquids on a conveyor at a velocity equal at least to one-half of the square root of twice the product of the constant of gravity, multiplied by the total depth of the liquids on the conveyor, the different liquids being fed superimposed according to their densities in the whole width and depth with the same velocity as the conveyor, feeding the materials to be separated upon the stream at its beginning in a layer of an average thickness equal to the largest particle size of the materials, the light particles floating on the surface, the particles of intermediate densities floating between the heavy liquid layers of densities which comprise the densities of the particles, and the heaviest particles sinking to the conveyor, cutting the stream horizontally after its having left the conveyor at the free fall, dividing the stream into its different layers carrying the particles of different densities, taking the separated products from each fraction of the heavy liquids, and returning each fraction to the feeding point after correction of its density.

5. An apparatus for the separation of solid materials of different specific gravities, utilizing a stream of heavy liquids of intermediate densities, comprising a troughed horizontal conveyor of invariable form and dimensions including an endless belt bottom carrying the heavy liquid without turbulence, the conveyor trough being completely free on its discharge end, means for feeding the conveyor at the opposite end with heavy liquid in the required depth and at the same velocity as the velocity of the conveyor, means for driving the conveyor at a velocity at least equal to one-half of the square root of twice the product of the constant of gravity multiplied by the depth of the liquid upon the conveyor, means for feeding the solid materials to be separated to the stream at said opposite end, adjustable means for cutting the stream horizontally at the free fall discharge for dividing the stream into different layers carrying particles of the solid materials of different densities, and means for conducting each of these heavy liquid fractions individually to means for separating the carried solid fractions and after correcting their densities to the feeding point of the horizontal stream.

6. An apparatus for the separation of solid materials of different specific gravities, utilizing a stream of heavy liquids of intermediate densities, comprising a troughed horizontal conveyor of invariable form and dimensions including an endless belt bottom carrying the heavy liquid without turbulence, the conveyor trough being completely free on its discharge end, means for feeding the conveyor at the opposite end with heavy liquid in the required depth and with the same velocity as the velocity of the conveyor, means for driving the conveyor at a velocity at least equal to one-half of the square root of twice the product of the constant of gravity multiplied by the depth of the liquid upon the conveyor, means for continuously feeding solid materials to the heavy liquid stream at said opposite end with the same horizontal velocity as the conveyor in a uniform layer of a thickness at least equal to the largest particle size, means for immersing the floating particles of solid materials, adjustable means for cutting the stream horizontally at the free fall discharge end for dividing the stream into different layers carrying particles of the solid materials of different densities, and means for conducting each of these heavy liquid fractions individually to means for separating the carried solid fractions and after correcting their densities to the feeding point of the horizontal stream.

7. An apparatus for the separation of solid materials of different specific gravities, utilizing a stream of heavy liquids of intermediate densities, comprising a troughed endless belt conveyor of invariable form and dimensions including a horizontal bottom and substantially vertical side walls having a height sufficient to confine heavy liquid to the required depth, spaced drums supporting the belt and about which the belt passes, said side walls being extensible, the conveyor trough being completely free at its discharge end, means for feeding the conveyor at the opposite end with heavy liquid in the required depth and with the same velocity as the velocity of the conveyor, means for driving the conveyor with a velocity at least equal to one-half of the square root of twice the product of the constant of gravity multiplied by the depth of the liquid upon the conveyor, means for feeding the solid material to be separated to the stream at said opposite end, the stream and solid materials therein discharging in a free fall discharge at the discharge end, adjustable means at the discharge end for cutting the stream horizontally at the free fall and dividing the stream into different layers carrying particles of solid materials of different densities, and means for conducting each of these heavy liquid fractions individually to means for separating the carried solid fractions and after correcting their densities to the feeding point of the horizontal stream.

8. An apparatus for the separation of solid materials of different specific gravities, utilizing a stream of heavy liquids of intermediate densities, comprising a troughed endless belt conveyor of invariable form and dimensions having a horizontal bottom and substantially vertical side walls of a height sufficient to confine the heavy liquid to the required depth, said walls being extensible and consisting of cellular porous rubber, spaced drums supporting the belt and about which the belt passes, the conveyor trough being completely free at its discharge end, means for feeding the conveyor trough at its opposite end with heavy liquid in the required depth and with the same velocity as the conveyor, means for driving the conveyor with a velocity at least equal to one-half of the square root of twice the product of the constant of gravity multiplied by the depth of the liquid upon the conveyor, means for feeding the solid materials to be separated to the stream at said opposite end, the stream and the solid materials therein discharging in a free fall discharge, adjustable means at the discharge end for cutting the stream horizontally at the free fall discharge for dividing the stream into different layers carrying particles of solid materials of different densities, and means for conducting each of these heavy liquid fractions individually to means for separating the carried solid fractions and after correcting their densities to the feeding point of the horizontal stream.

9. An apparatus for the separation of solid materials of different specific gravities, utilizing a stream of heavy liquids of intermediate densities, comprising a troughed endless belt conveyor of invariable form and dimensions including a horizontal bottom and substantially vertical side walls of a height sufficient to confine the heavy liquid to the required depth, spaced drums supporting the belt and said side walls being pleated so as to be extensible and thus turnable around said drums, the troughed conveyor being completely free on its discharge end, means for feeding the conveyor at its opposite end with heavy liquid in the required depth and at the same velocity as the velocity of the conveyor, means for driving the conveyor with a velocity at least equal to one-half of the square root of twice the product of the constant of gravity multiplied by the depth of the liquid upon the conveyor, means for feeding the solid materials to be separated to the stream at said opposite end, the stream and the solid materials therein discharging in a free fall discharge, adjustable means at the discharge end for cutting the stream horizontally at the free fall discharge for dividing the stream into different layers carrying particles of solid materials of different densities, and means for conducting each of these heavy liquid fractions individually to means for separating the carried solid fractions and after correcting their densities to the feeding point of the horizontal stream.

10. An apparatus for the separation of solid materials of different specific gravities, utilizing a stream of heavy liquids of intermediate densities, comprising a troughed endless belt bottom carrying the heavy liquid without turbulence, said conveyor being constituted by a fixed trough including a horizontal bottom and side walls completely open at the discharge end and said endless belt having the same width as and sliding on the horizontal bottom of the fixed trough and returning beneath the same, means for feeding the conveyor at its opposite end with heavy liquid in the required depth and at the same velocity as the conveyor, means for driving the conveyor belt with the same velocity, at least equal to one-half of the square root of twice the product of the constant of gravity multiplied by the depth of the liquid upon the conveyor, means for feeding the solid materials to be separated to the stream at said opposite end, the stream and the solid materials therein discharging in a free fall discharge, adjustable means at the discharge end for cutting the stream horizontally at the free fall discharge for dividing the stream into different layers carrying particles of solid materials of different densities, and means for conducting each of these heavy liquid fractions individually to means for separating the carried solid fractions and after correcting their densities to the feeding point of the horizontal stream.

11. An apparatus for the separation of solid materials of different specific gravities, utilizing a stream of heavy liquids of intermediate densities, comprising a troughed horizontal conveyor including an endless belt bottom carrying the heavy liquid without turbulence, the conveyor having invariable form and dimensions and being constituted by a fixed horizontal trough including a bottom and side walls completely open at the discharge end, said endless belt having the same width as and sliding on the horizontal bottom of the fixed trough and returning beneath the same, metallic members attached to the belt for weighting the same and improving the friction coefficient between the belt and the bottom of the fixed trough, means for feeding the conveyor at its opposite end with heavy liquid in the required depth and at the same velocity as the conveyor, means for driving the conveyor belt with the same velocity, at least equal to one-half of the square root of twice the product of the constant of gravity multiplied by the depth of the liquid upon the conveyor, means for feeding the solid materials to be separated to the stream at said opposite end, the stream and the solid materials therein discharging in a free fall discharge, adjustable means at the discharge end for cutting the stream horizontally at the free fall discharge for dividing the stream into different layers carrying particles of solid materials of different densities, and means for conducting each of these heavy liquid fractions individually to means for separating the carried solid fractions and after correcting their densities to the feeding point of the horizontal stream.

12. An apparatus for the separation of solid materials of different specific gravities, utilizing a stream of heavy liquids of intermediate densities, comprising a troughed horizontal conveyor of invariable form and dimensions including an endless belt bottom carrying the heavy liquid without turbulence, the said trough conveyor being constituted by three endless belt conveyors, a horizontal conveyor constituting the said endless belt bottom, the other two conveyors being spaced and vertically mounted upon the edges of the first and constituting the side walls, said side walls having a height sufficient to confine the stream to the required depth, the discharge end of the troughed conveyor being completely open, means for feeding the conveyor at the opposite end with heavy liquid in the required depth and with the same velocity as the conveyors, means for driving all three belts with the same velocity, at a rate at least equal to one-half of the square root of twice the product of the constant of gravity multiplied by the depth of the liquid upon the conveyor, means for feeding the solid materials to be separated to the stream at said opposite end, the stream and the solid materials therein discharging in a free fall discharge, adjustable means at the discharge end for cutting the stream horizontally at the free fall discharge for dividing the stream into different layers carrying particles of solid materials of different densities, and means for conducting each of these heavy liquid fractions individually to means for separating the carried solid fractions and after correcting their densities to the feeding point of the horizontal stream.

13. An apparatus for the separation of solid materials of different specific gravities, utilizing a stream of heavy liquids of intermediate densities, comprising a troughed horizontal conveyor of invariable form and dimensions including an endless belt bottom carrying the heavy liquid without turbulence, the troughed conveyor being constituted by three endless belt conveyors, a horizontal conveyor constituting the said endless belt bottom, the other two conveyors being opposed and vertically mounted upon the edges of the first and constituting the side walls of the trough, said side walls being of sufficient height to confine the stream to the required depth, the discharge end of the trough being completely open, a fixed trough including a horizontal bottom and side walls slidably receiving said conveyors, said conveyors returning respectively beneath the bottom and behind the side walls of said fixed trough, means for feeding the conveyor at the opposite end with heavy liquid in the required depth and with the same velocity as the conveyors, means for driving all three belts with the same velocity, at a rate at least equal to one-half of the square root of twice the product of the constant of gravity multiplied by the depth of the liquid upon the conveyor, means for feeding the solid materials to be separated to the stream at said opposite end, the stream and the solid materials therein discharging in a free fall discharge, adjustable means at the discharge end for cutting the stream horizontally at the free fall discharge for dividing the stream into different layers carrying particles of solid materials of different densities, and means for conducting each of these heavy liquid fractions individually to means for separating the carried solid fractions and after correcting their densities to the feeding point of the horizontal stream.

WALTER VOGEL.

REFERENCES CITED

The following references are of record in the file of this patent:

UNITED STATES PATENTS

| Number | Name | Date |
|---|---|---|
| 184,378 | Hooper | Nov. 14, 1871 |
| 221,350 | Patterson | Nov. 4, 1879 |
| 2,150,946 | Smith | Mar. 21, 1939 |
| 2,171,674 | Schifferle | Sept. 5, 1939 |
| 2,314,542 | Kern | Mar. 23, 1943 |
| 2,417,477 | Finney | Mar. 18, 1947 |

FOREIGN PATENTS

| Number | Country | Date |
|---|---|---|
| 11,177 | Great Britain | of 1890 |